April 26, 1949. A. W. BAKER Re. 23,102

WATERPROOF EXPLOSIVE CARTRIDGE

Original Filed Nov. 10, 1942

Arthur W. Baker
INVENTOR.

BY Cleveland B. Hollaway
ATTORNEY

Reissued Apr. 26, 1949 Re. 23,102

UNITED STATES PATENT OFFICE 23,102

WATERPROOF EXPLOSIVE CARTRIDGE

Arthur W. Baker, Webster Groves, Mo., assignor to Hercules Powder Company, Wilmington, Del., a corporation of Delaware Original No. 2,408,189, dated September 24, 1946, Serial No. 465,105, November 10, 1942. Application for reissue August 21, 1947, Serial No. 769,811

5 Claims. (Cl. 102—24)

This invention relates to an improved cartridge for blasting explosives and, more particularly, to a waterproof cartridge of large diameter which will afford protection against water penetration for blasting explosives containing large amounts of water-soluble salts so that these explosives may be used in wet holes and under reasonable heads of water.

For submarine and other blasting operations where it is necessary to use explosives under water, the industry has made use of highly water-resistant gelatins and gelatinized dynamite instead of the cheaper, equally effective, ammonium nitrate dynamites which are easily destroyed by water. Attempts have been made to develop a waterproof cartridge but these efforts have failed to produce a container which would permit the economical use of water-soluble explosives under severe water conditions. There have been various methods employed to achieve this purpose, but, so far, they have not proven entirely satisfactory.

Cartridges have been made of various materials, such as, paper, rubber, metal, and combinations of waterproofed extensible paper and fibres. These cartridges have been closed with folded crimps, rolled crimps and wire ties. They have been dipped in latex, waxes, asphalts, etc., in order to provide protection from water penetration. However, none of these schemes have been truly effective because, generally, they were difficult to manufacture and easily damaged either during the course of manufacture or during usage in the field.

The greatest disadvantage of most of the previous practical waterproof cartridges is the fact that they are not strong enough to stand the handling incident to transportation and loading in the field. Sealed containers of rubber, rubberized cloth, and metal, if they are made strong enough to be effective, are too costly to be economically feasible. Containers made of creped paper laminated with asphalt, though composed of flexible waterproof materials, are subject to easy puncture by protecting rock, etc., because of their lack of actual mechanical strength.

The object of this invention is to provide a waterproof explosive cartridge.

A further object of this invention is to provide a waterproof explosive cartridge of sufficient strength to withstand rough usage.

A further object of this invention is to provide a means of sealing the ends of large sized exposive cartridges in a waterproof manner.

A further object of this invention is to provide a waterproof semiflexible seal for the crimped end of large diameter explosive cartridges.

The specific object of this invention is to provide an inexpensive and effective, large diameter, waterproof explosive cartridge so that ammonium nitrate dynamites and other water-soluble explosives may be used under water in place of more costly gelatin explosives.

Other objects will appear hereinafter.

To accomplish these objects in accordance with this invention a waterproof cartridge has been produced which will protect water-soluble explosives. The cartridge comprises in general a cylindrical body, made of manila and laminated waterproof paper, the ends of which are crimped and sealed with a suitable semiflexible compound to form a water-tight end closure.

More particularly, the objects in accordance with this invention are accomplished by preparing an explosive cartridge which includes a tube of paper either spirally or convolutely wrapped, a covering on this tube consisting of a laminated asphalt paper wrapped completely around the inner paper tube and sealed to itself so as to form a waterproof envelope surrounding the explosive, and superimposed on this laminated paper is another tube of paper either spirally or convolutely wrapped. The ends of the tubular cartridge are crimped by known means such as a fluted crimp, a rolled crimp, or the like, and under this crimp is placed a disc of paper or cardboard which is snugly fitted and positioned to prevent a sealing compound which is subsequently added from contacting the explosive in the cartridge. The sealing compound which is a semiflexible solid at room temperatures may be a wax or resin-like material that is waterproof and adhesive to the cartridge. The water-impervious sealing compound has the property of pouring at temperatures which are safe for explosive operations and has the further property of being a hard but semiflexible material at temperatures encountered under explosive storage conditions.

This waterproof dynamite cartridge of the present invention consists of a strong paper tube, having one or more of its central layers consisting of a laminated waterproof paper, closed at both ends by a crimp over a disc of paper or cardboard and sealed with a thick layer of wax or similar substance.

In order to more clearly indicate the structure of the cartridge of the present invention, preferred embodiments are presented in the attached drawing in which.

Figure 1:
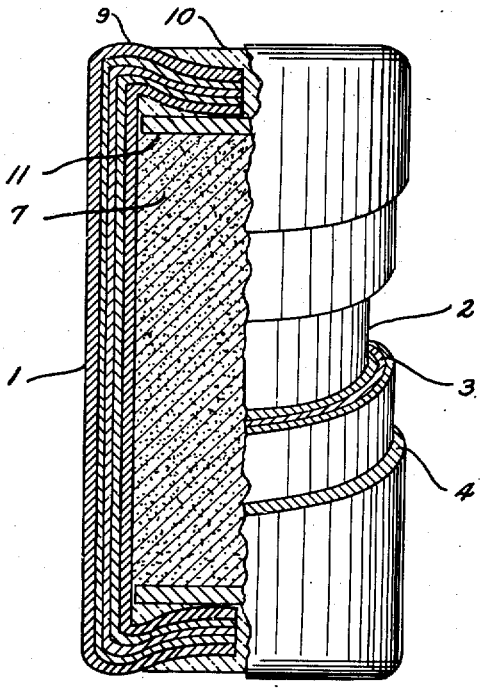
Fig. 1 is a part elevational, part sectional view of a cartridge.

Referring now to Fig. 1, there is shown an explosive cartridge 1 made up of three layers of material designated as 2, 3, and 4, respectively. Layer 2 is a manila paper wrapped on itself either spirally or convolutely. Layer 3 is a laminated asphaltic paper wrapped on itself either spirally or convolutely and in either event sealed to itself to form a water-impervious tube. Layer 4 is a manila paper similar to layer 2 and is similarly wrapped. An explosive composition 7 is positioned in the cartridge and is sealed therein by crimps 9 and a water-impervious sealing compound 10. A paper or cardboard disc 11 is disposed beneath the crimps 9 at each end of the cartridge 1. This disc sustains the explosive composition during the sealing operation and prevents the sealing compound from contacting the explosive composition. The sealing compound 10 in liquid form is poured into place and solidifies to form a seal of semiflexible material and this seal binds and waterproofs the cartridge. The movement encountered in normal handling, transportation and loading will not cause the semiflexible seal to crack.

Figure 2:
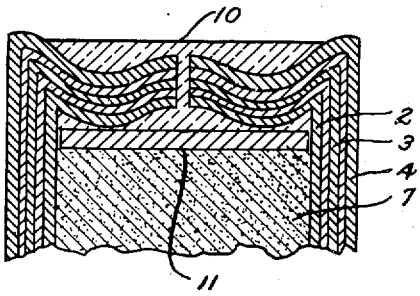
Figs. 2 and 3 are fragmentary sectional views of fluted and rolled crimps, respectively, sealed with a desirable sealing compound.
Figure 3:
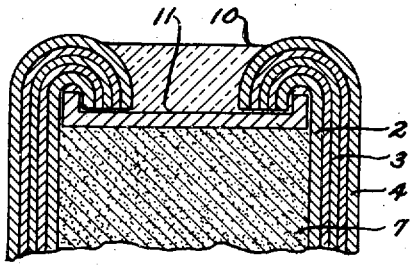

In Figs. 2 and 3 are shown methods of crimping and sealing the ends of the cartridges. Thus, the crimp may be fluted (Fig. 2) or rolled (Fig. 3). In either instance, the water-impervious sealing compound forms a layer 10 which waterproofly closes the cartridge. The sealing material is disposed on each side of the crimped end section forming upper and lower layers and having a contiguous central portion passing through the crimped end section thus joining the two layers to form a homogeneous mass or layer 10. In the rolled or shotgun crimp (Fig. 3) the cardboard disc 11 is shown to be in cup form which gives better sealing but is not essential.

Figure 4:
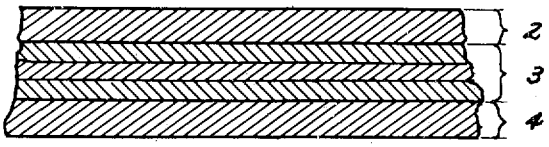
Fig. 4 is a fragmentary sectional view of the construction of the side wall of the cartridge.

In Fig. 4, the construction of the side walls of the cartridge is shown and the inner layer 3 represents an asphalt laminated paper but any waterproof laminated paper may be used. The outer layers 2 and 4 are manila or kraft paper and may be either of a single or plurality of layers of paper.

The following examples are illustrative of the present invention:

*Example I*

A shell for packing a 5" x 16" cartridge of dynamite was prepared. The paper tube for the body of the shell was a four-ply, spiral-wrapped container composed of three plies of manila paper and one ply of an asphaltic laminated kraft paper. This tube was manufactured by spirally wrapping two plies of the manila paper on a fixed mandrel, then covering these with a ply of laminated paper which was wider than the manila so that it overlaps itself at the joint. Finally, the third ply was covered by a ply of manila paper which was the same width as the inner plies. The various plies were glued together with glue applied to the paper before wrapping the tube. The spiral tube was continuously formed and lengths suitable for the final shell were cut off. The manufacture of the tube was performed in the same manner as similar tubes for mailing, etc., and is not part of this invention.

The completed tube was closed at one end with a folded, fluted crimp formed by a mechanical crimper. When the glue dried, the shell was passed through a paraffin spray to saturate the manila paper to prevent water and explosive oil penetration. A snug-fitting cardboard disc was inserted in the closed end of the shell which then was packed with dynamite. After this another disc was inserted and a second crimp was formed in the same manner as the first.

The loaded, crimped cartridge was then sealed by pouring a mixture of a micro-crystalline wax and paraffin into the crimped ends. A sufficient quantity was added to form a complete layer between the cardboard disc and the crimp and to cover the outside of the crimp, so that all of the folded paper was effectively sealed. After sealing, the entire assembly was dipped in the usual manner in a paraffin bath to further protect the outer ply from water penetration.

*Example II*

In another example of this invention, a shell for packing a 5" x 16" cartridge of dynamite was formed of a convolute tube rolled either manually or by a machine. In the case of this convolute shell the manila and laminated papers are so arranged that the laminated paper is glued to itself, forming a complete cylinder. The crimping and sealing were carried out in the manner of Example I.

*Example III*

In another example of this invention, one set of 5" x 16" cartridges were prepared by spiral wrapping and gluing 5 plies of 90# manila paper. Another set of 5" x 16" cartridges were prepared by spiral wrapping and gluing 2 plies of 90# manila paper, then 1 ply of water proof laminated paper, and then 1 ply of 90# manila paper. These cartridges were treated with paraffin spray, then packed with uncoated ammonium nitrate and crimped. They were then sealed with micro-crystalline wax and dipped in a paraffin bath, as described in Example I. The cartridges were immersed in water for two hours at a pressure of 5 pounds per square inch and at a temperature of from 64 to 66° F. The following table shows the results of this test.

| Plies | No. of tests | Gain in weight average | Per cent of explosive good—average |
|---|---|---|---|
| | | *Grams* | |
| 5 plies 90# manila (none laminated) | 4 | 201 | 51 |
| 2 plies 90# manila, 1 ply laminated, 1 ply 90# manila | 8 | 24 | 100 |

*Example IV*

In still another example of this invention, a set of 3" x 16" cartridges were prepared by spiral wrapping and gluing 3 plies of 64# manila paper, then 1 ply of water proof laminated paper, and then 1 ply of 64# manila paper. These cartridges were packed with a semigelatin explosive, crimped and then dipped in paraffin. Some of the cartridges were redipped in paraffin only, while some others were sealed with a micro-crystalline wax composition, consisting of a blend of 75% paraffin and 25% of "Product 2300," and then redipped in paraffin. These cartridges were immersed in water for two hours at a pressure of 5 pounds per square inch and at a temperature of about 62° F. The following table shows the results of this test.

| Treatment | No. of tests | Gain in weight average | Per cent of explosive good—average |
|---|---|---|---|
| | | *Grams* | |
| Redipped only | 3 | 321 | 18 |
| Sealed with blend 75% paraffin—25% product 2300 and then redipped | 6 | 13 | 100 |

It is readily seen that the waterproof cartridges of Examples III and IV as prepared in accordance with the present invention were far superior to the cartridges not prepared in accordance with the invention. This is shown by the differences in the percent of explosive which was "good" after the immersion tests. The "percent of explosive good" means that portion of the explosive which was unaffected by moisture penetration, thereby remaining readily detonatable and capable of propagation in its full strength. It has been found in packaging some explosives which have little or no water resistance that as low as .2% moisture content will deleteriously effect the detonation and propagation properties of the explosive, therefore, the cartridges must be absolutely moisture impervious.

The paper tube used in the cartridges described in the examples is formed of several plies of manila paper and one or more plies of a waterproof laminated paper. The laminated paper is an essential part of the tube, if it is to be waterproof, and may be one of several types. For instance, the laminae may be creped or otherwise extensible paper or they may be ordinary kraft or manila paper. The laminant is a waterproof adhesive binder such as an asphalt, a resin, or a micro-crystalline wax.

To make the waterproof shell, a tube is formed containing one or more inner plies of manila paper, one or more plies of laminated paper, and finally, an outside ply of manila. The inner plies of manila paper provide rigidity, the laminated paper prevents water penetration, and the outside ply of manila protects the laminated paper from damage by abrasion. In order to obtain maximum waterproofness the laminated paper must form a complete cylinder about the inner plies.

The ends of the shell are closed with cardboard discs and symmetrical fluted crimps. The fluted crimps are formed so that the ends of the shell have a shallow cup-shape. These are sealed with a quantity of wax sufficient to form a complete layer across the disc and to cover the fluted crimp. The purpose of the disc is to prevent the wax from soaking into the explosive with which the shell is loaded and to prevent leakage of the explosive during the manufacturing operation.

The compound used for sealing the cartridge may be any material which will pour at a temperature below the danger point for the explosive used in loading the cartridges and which will be adhesive, tough and hard at ordinary atmospheric temperatures and water-impervious. Suitable compounds may be micro-crystalline waxes, resins, and asphalts or mixtures of these and similar compounds. The sealing compound may be illustrated by a number of commercial resinous or wax-like products such as the "Flexo" resins, "Flexo Wax C," "Ceroflux," and "Adheso Wax" of Glyco Products Company and described in their booklet, Chemicals by Glyco, copyright 1941, and the microcrystalline (amorphous) petroleum wax products "P. D. 300" and "2300" of Socony-Vacuum Oil Company.

For cartridges of larger size the same general scheme, as outlined in the above examples, should be followed except, if desirable, more plies can be added to increase the strength of the shell.

While the waterproof explosive cartridge described in the above paragraphs is preferable for packaging any explosive, which in itself may have little or no water resistance, to protect said explosive from water penetration when used in or around water, it may also be used for the more water-resistant explosives, if desired.

What I claim and desire to protect by Letters Patent is:

1. A rigid blasting cartridge comprising a substantially cylindrical explosive charge of a water-soluble material and a substantially rigid water-resistant tubular envelope therefor and having water-resistant crimped end closures; the tubular envelope comprising a tube of a water-proof laminated paper sealed to itself and overlapping itself at opposed edges, a paper lining for said laminated tube and sealed thereto, a paper covering for said laminated tube and sealed thereto; the tubular envelope having a cardboard disc at each end interiorly thereof and having an end section crimped over each disc, and a seal for each end section comprising an adhesive waxlike material disposed on each side of the crimped end section forming upper and lower layers and having a contiguous central portion passing through the crimped end section thus joining the two layers.

2. A rigid blasting cartridge comprising a substantially cylindrical explosive charge of a water-soluble material and a substantially rigid water-resistant tubular envelope therefor and having water-resistant crimped end closures; the tubular envelope comprising a tube of an asphaltic laminated paper sealed to itself and overlapping itself at opposed edges, a paper lining for said laminated tube and sealed thereto, a paper covering for said laminated tube and sealed thereto; the tubular envelope having a cardboard disc at each end interiorly thereof and having an end section crimped over each disc by means of fluted crimps, and a seal for each end section comprising an adhesively waxlike material disposed on each side of the crimped end section forming upper and lower layers and having a contiguous central portion passing through the crimped end section thus joining the two layers.

3. An end closure for a tubular envelope comprising a disc disposed interiorly of said envelope; an end section of said envelope crimped over said disc inwardly generally at right angles to the tubular axis and substantially closing the end of the tubular envelope; and a seal of an adhesive, waxlike material disposed on each side of the crimped end section forming upper and lower layers, said layers being bonded to each other by said adhesive passing through the opening in the crimped end section thus joining the two layers.

4. A waterproof end closure for a tubular envelope comprising a cardboard disc disposed interiorly of said envelope; an end section of said envelope crimped over said disc by means of fluted crimps folded inwardly generally at right angles to the tubular axis and substantially closing the end of the tubular envelope; and a seal of an adhesive, waxlike material disposed on each side of the crimped end section forming upper and lower layers, said layers being bonded to each other by said adhesive passing through the opening in the crimped end section thus joining the two layers.

5. An end closure for a tubular envelope comprising an end section of said envelope crimped inwardly generally at right angles to the tubular axis and substantially closing the end of the tubular envelope, a layer of an adhesive waxlike material disposed on each side of said crimped end section, said layers being bonded to each other by said adhesive passing through the opening in the crimped end section thus joining the two layers.

ARTHUR W. BAKER.

REFERENCES CITED

The following references are of record in the file of this patent:

UNITED STATES PATENTS

| Number | Name | Date |
|---|---|---|
| 969,186 | Peters | Sept. 6, 1910 |
| 1,144,379 | Pritham | June 29, 1915 |
| 1,173,267 | Harbeck | Feb. 29, 1916 |
| 1,230,121 | Comstock | June 19, 1917 |
| 1,234,683 | Myerscough | July 24, 1917 |
| 1,553,762 | Fabrizio | Sept. 15, 1925 |
| 1,687,929 | Cimorosi | Oct. 16, 1928 |
| 2,023,784 | Farren et al. | Dec. 10, 1935 |
| 2,066,635 | Lux | Jan. 5, 1937 |
| 2,087,209 | Lahey et al. | July 13, 1937 |
| 2,141,556 | Reifsnyder | Dec. 27, 1938 |
| 2,179,864 | Scott | Nov. 14, 1939 |
| 2,184,166 | Rape | Dec. 19, 1939 |
| 2,326,310 | Johnson et al. | Aug. 10, 1943 |